US010611679B2

(12) United States Patent
Veerasamy

(10) Patent No.: US 10,611,679 B2
(45) Date of Patent: Apr. 7, 2020

(54) COATED ARTICLE INCLUDING NOBLE METAL AND POLYMERIC HYDROGENATED DIAMOND LIKE CARBON COMPOSITE MATERIAL HAVING ANTIBACTERIAL AND PHOTOCATALYTIC PROPERTIES, AND/OR METHODS OF MAKING THE SAME

(71) Applicant: Guardian Glass, LLC, Auburn Hills, MI (US)

(72) Inventor: Vijayen S. Veerasamy, Ann Arbor, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 211 days.

(21) Appl. No.: 15/794,462

(22) Filed: Oct. 26, 2017

(65) Prior Publication Data

US 2019/0127271 A1    May 2, 2019

(51) Int. Cl.
  *C03C 17/36*    (2006.01)
  *C03C 17/34*    (2006.01)
  *C03B 27/012*   (2006.01)

(52) U.S. Cl.
  CPC ...... *C03C 17/3613* (2013.01); *C03C 17/3435* (2013.01); *C03C 17/3441* (2013.01);
  (Continued)

(58) Field of Classification Search
  USPC ........................ 427/577; 428/408, 426, 701
  See application file for complete search history.

(56) References Cited

U.S. PATENT DOCUMENTS 2,461,019 A    2/1949  Alexander
4,715,879 A   12/1987  Schmitte et al.
(Continued)

FOREIGN PATENT DOCUMENTS

DE    101 62 888    7/2003
EP      1 623 657    2/2006
(Continued)

OTHER PUBLICATIONS

Marciano et al "Antibacterial activity of DLC and Ag-DLC produced by PECVD technique" Diamond & Realted Materials 18 p. 1010-1014. (Year: 2009).*
(Continued)

*Primary Examiner* — Archene A Turner

(57) ABSTRACT

Certain example embodiments of this invention relate to coated articles including noble metal (e.g., Ag) and polymeric hydrogenated diamond like carbon (DLC) (e.g., a-C:H, a-C:H:O) composite material having antibacterial and photocatalytic properties, and/or methods of making the same. A glass substrate supports a buffer layer, a matrix comprising the noble metal and DLC, a proton-conducting layer that may comprising zirconium oxide in certain example embodiments, and a layer comprising titanium oxide. The layer comprising titanium oxide may be photocatalytic and optionally may further include carbon and/or nitrogen. The proton-conducting layer may facilitate the creation of electron-hole pairs and, in turn, promote the antibacterial properties of the coated article. The morphology of the layer comprising titanium oxide and/or channels formed therein may enable Ag ions produced from matrix to migrate therethrough.

25 Claims, 4 Drawing Sheets

(52) U.S. Cl.
CPC ...... *C03C 17/3618* (2013.01); *C03C 17/3644* (2013.01); *C03B 27/012* (2013.01); *C03C 17/36* (2013.01); *C03C 17/3652* (2013.01); *C03C 17/3681* (2013.01); *C03C 2204/02* (2013.01); *C03C 2217/212* (2013.01); *C03C 2217/22* (2013.01); *C03C 2217/28* (2013.01); *C03C 2217/425* (2013.01); *C03C 2217/45* (2013.01); *C03C 2217/479* (2013.01); *C03C 2217/71* (2013.01); *C03C 2217/75* (2013.01); *C03C 2217/78* (2013.01); *C03C 2217/948* (2013.01); *C03C 2218/355* (2013.01)

(56) References Cited

U.S. PATENT DOCUMENTS

| | | | |
|---|---|---|---|
| 5,059,295 | A | 10/1991 | Finley |
| 5,073,450 | A | 12/1991 | Nietering |
| 5,135,808 | A | 8/1992 | Kimock et al. |
| 5,279,808 | A | 1/1994 | Xiao et al. |
| 5,470,661 | A | 11/1995 | Bailey et al. |
| 5,599,422 | A | 2/1997 | Adams, Jr. et al. |
| 5,635,245 | A | 6/1997 | Kimock et al. |
| 5,807,641 | A | 9/1998 | Oku et al. |
| 5,853,866 | A | 12/1998 | Watanabe et al. |
| 5,858,477 | A | 1/1999 | Veerasamy et al. |
| 5,869,187 | A | 2/1999 | Nakamura et al. |
| 5,888,593 | A | 3/1999 | Petrmichl et al. |
| 5,900,342 | A | 5/1999 | Visser et al. |
| 5,935,702 | A | 8/1999 | MacQuart et al. |
| 6,002,208 | A | 12/1999 | Maishev et al. |
| 6,055,085 | A | 4/2000 | Nakashima et al. |
| 6,107,241 | A | 8/2000 | Ogata et al. |
| 6,210,779 | B1 | 4/2001 | Watanabe et al. |
| 6,235,401 | B1 | 5/2001 | Ogata et al. |
| 6,242,752 | B1 | 6/2001 | Soma et al. |
| 6,261,693 | B1 | 7/2001 | Veerasamy |
| 6,280,834 | B1 | 8/2001 | Veerasamy et al. |
| 6,284,377 | B1 | 9/2001 | Veerasamy |
| 6,303,225 | B1 | 10/2001 | Veerasamy |
| 6,303,226 | B2 | 10/2001 | Veerasamy |
| 6,312,808 | B1 | 11/2001 | Veerasamy et al. |
| 6,335,086 | B1 | 1/2002 | Veerasamy |
| 6,338,901 | B1 | 1/2002 | Veerasamy |
| 6,344,277 | B1 | 2/2002 | Ogata et al. |
| 6,344,278 | B1 | 2/2002 | Ogata et al. |
| 6,362,121 | B1 | 3/2002 | Chopin et al. |
| 6,376,057 | B1 | 4/2002 | Akao et al. |
| 6,376,888 | B1 | 4/2002 | Tsunashima et al. |
| 6,379,811 | B2 | 4/2002 | Ogata et al. |
| 6,387,884 | B1 | 5/2002 | Fujishima et al. |
| 6,447,891 | B1 | 9/2002 | Veerasamy et al. |
| 6,461,731 | B1 | 10/2002 | Veerasamy et al. |
| 6,531,182 | B2 | 3/2003 | Veerasamy et al. |
| 6,572,940 | B1 | 6/2003 | Noethe et al. |
| 6,576,349 | B2 | 6/2003 | Lingle et al. |
| 6,592,992 | B2 | 7/2003 | Veerasamy |
| 6,592,993 | B2 | 7/2003 | Veerasamy |
| 6,663,753 | B2 | 12/2003 | Veerasamy et al. |
| 6,682,773 | B2 | 1/2004 | Medwick et al. |
| 6,743,348 | B2 | 6/2004 | Holladay et al. |
| 6,770,321 | B2 | 8/2004 | Hukari et al. |
| 6,818,309 | B1 | 11/2004 | Talpaert et al. |
| 6,827,977 | B2 | 12/2004 | Veerasamy |
| 6,884,752 | B2 | 4/2005 | Andrews |
| 6,887,575 | B2 | 5/2005 | Neuman et al. |
| 6,902,579 | B2 | 7/2005 | O'Shaughnessy et al. |
| 6,921,579 | B2 | 7/2005 | O'Shaughnessy et al. |
| 6,936,347 | B2 | 8/2005 | Laird et al. |
| 6,939,611 | B2 | 9/2005 | Fujishima et al. |
| 6,974,630 | B1 | 12/2005 | Stachowiak |
| 6,991,339 | B2 | 1/2006 | Tonar et al. |
| 7,004,591 | B2 | 2/2006 | Kobayashi et al. |
| 7,005,189 | B1 | 2/2006 | Tachibana et al. |
| 7,005,190 | B2 | 2/2006 | Laird |
| 7,060,322 | B2 | 6/2006 | Veerasamy |
| 7,067,175 | B2 | 6/2006 | Veerasamy |
| 7,101,810 | B2 | 9/2006 | Bond et al. |
| 7,150,849 | B2 | 12/2006 | Veerasamy |
| 7,449,218 | B2 | 11/2008 | Veerasamy |
| 7,501,148 | B2 | 3/2009 | Veerasamy |
| 7,507,442 | B2 | 3/2009 | Veerasamy |
| 7,662,161 | B2 | 2/2010 | Briganti et al. |
| 7,833,574 | B2 | 11/2010 | Murphy et al. |
| 7,846,492 | B2 | 12/2010 | Veerasamy et al. |
| 7,892,662 | B2 | 2/2011 | Veerasamy et al. |
| 7,914,857 | B2 | 3/2011 | Krasnov et al. |
| 7,964,238 | B2 | 6/2011 | Murphy et al. |
| 8,003,167 | B2 | 8/2011 | Krasnov et al. |
| 8,071,166 | B2 | 12/2011 | Petrmichl et al. |
| 8,092,912 | B2 | 1/2012 | Veerasamy et al. |
| 8,132,426 | B2 | 3/2012 | Petrmichl et al. |
| 8,187,671 | B2 | 5/2012 | Sol |
| 8,221,833 | B2 | 7/2012 | Veerasamy et al. |
| 8,443,627 | B2 | 5/2013 | Petrmichl et al. |
| 9,255,029 | B2 | 2/2016 | Veerasamy |
| 2002/0045073 | A1 | 4/2002 | Finley |
| 2002/0064662 | A1 | 5/2002 | Lingle et al. |
| 2002/0068167 | A1 | 6/2002 | Veerasamy |
| 2002/0107144 | A1 | 8/2002 | Fujishima et al. |
| 2003/0013265 | A1 | 1/2003 | Yang et al. |
| 2003/0118860 | A1 | 6/2003 | O'Shaughnessy et al. |
| 2003/0170464 | A1 | 9/2003 | Veerasamy |
| 2003/0235720 | A1 | 12/2003 | Athey et al. |
| 2004/0209126 | A1 | 10/2004 | Ziegler et al. |
| 2004/0258890 | A1 | 12/2004 | Miller et al. |
| 2004/0258926 | A1 | 12/2004 | Veerasamy |
| 2005/0008852 | A1 | 1/2005 | Hartig |
| 2005/0048284 | A1 | 3/2005 | Veerasamy |
| 2005/0095430 | A1 | 5/2005 | Veerasamy |
| 2005/0095431 | A1 | 5/2005 | Veerasamy |
| 2005/0191494 | A1 | 9/2005 | Veerasamy |
| 2005/0234178 | A1 | 10/2005 | Andrews |
| 2005/0260419 | A1 | 11/2005 | Hukari et al. |
| 2006/0003545 | A1 | 1/2006 | Veerasamy |
| 2006/0057294 | A1 | 3/2006 | Veerasamy et al. |
| 2006/0166008 | A1 | 7/2006 | Hsiao et al. |
| 2006/0166009 | A1 | 7/2006 | Veerasamy et al. |
| 2007/0017624 | A1 | 1/2007 | Thomsen et al. |
| 2007/0042187 | A1 | 2/2007 | Veerasamy |
| 2007/0231553 | A1 | 10/2007 | Hartig et al. |
| 2007/0254164 | A1 | 11/2007 | Veerasamy et al. |
| 2007/0281168 | A1 | 12/2007 | Varanasi et al. |
| 2008/0020211 | A1 | 1/2008 | Petrmichl et al. |
| 2008/0178632 | A1 | 7/2008 | Petrmichl et al. |
| 2008/0182032 | A1 | 7/2008 | Krasnov et al. |
| 2008/0182033 | A1 | 7/2008 | Krasnov et al. |
| 2008/0182123 | A1 | 7/2008 | Murphy et al. |
| 2008/0199702 | A1 | 8/2008 | Murphy et al. |
| 2009/0123654 | A1 | 5/2009 | Petrmichl et al. |
| 2010/0021642 | A1 | 1/2010 | Sol |
| 2011/0256408 | A1 | 10/2011 | Wang et al. |
| 2011/0274854 | A1 | 11/2011 | Veerasamy |
| 2012/0082789 | A1 | 4/2012 | Veerasamy et al. |
| 2012/0114878 | A1 | 5/2012 | Petrmichl et al. |
| 2013/0015677 | A1 | 1/2013 | Benito Gutierrez et al. |
| 2013/0216860 | A1 | 8/2013 | Imran et al. |
| 2015/0345206 | A1 | 12/2015 | Vikor et al. |

FOREIGN PATENT DOCUMENTS

| | | |
|---|---|---|
| EP | 1 637 225 | 3/2006 |
| EP | 1 640 149 | 3/2006 |
| GB | 2 186 001 | 8/1987 |
| JP | 11-263629 | 9/1999 |
| JP | 2001-300326 | 10/2001 |
| JP | 2002-151000 | 5/2002 |
| WO | 2004/113064 | 12/2004 |

(56) References Cited

FOREIGN PATENT DOCUMENTS

WO 2005/021454 3/2005
WO 2007/112229 10/2007

OTHER PUBLICATIONS

Endrino et al "Antibacterial efficacy fo advancws silver-amorphous carbon coatings deposited using the pulsed dual cathodic arc techique" Journal of Physics: Conference Series 252 012012 p. 1-6. (Year: 2010).*

Ahmed et al "Effect of silve rdoping on optical property of diamond like carbon films" Thin Solid Films 517 p. 4035-4038. (Year: 2009).*

Kwok et al "Hemocompatibility and anti-bacterial properties of silver doped diamond-like carbon prepared by pulsed filtered cathodic arc deposition" Diamond & Related Materials 16 p. 1353-1360. (Year: 2007).*

Hussain et al., "Incorporation of Silver Nanoparticles in DLC Matrix and Surface Plasmon Resonance Effect", Materials Chemistry and Physics, vol. 99, No. 2-3, Oct. 10, 2006.

R. Paul et al., "Synthesis and Characterization of Composite Films of Silver Nanoparticles Embedded in DLC Matrix Prepared by Plasma CVD Technique", European Physical Journal Applied Physics, vol. 47, No. 1, May 20, 2009.

Pisarik et al., "Antibacterial Mechanical and Surface Properties of Ag-DLC Films Prepared by Dual PLD for Medical Applications", Materials Science and Engineering C, Elsevier Science S.A., vol. 77, Apr. 6, 2017.

Jonathan Berson et al., "Single-Layer Ionic Conduction on Carboxyl-Terminated Silane Monolayers Patterned by Constructive Lithography", Nature Materials, DOI: 10.1038/NMAT4254, Apr. 6, 2015, 9 pages.

M. Harikishore et al., "Effect of AG Doping on Antibacterial and Photocatalytic Activity of Nanocrystalline $TiO_2$," Procedia Materials Science, vol. 6, Mar. 2014, pp. 557-566.

Milosev et al., "Comparison of TiN, ZrN, and CrN Hard Nitride Coating: Electrochemical and Thermal Oxidation". 1997. Thin Film Solids 303, pp. 246-254.

Sintef Materials and Chemistry, "Nanosized oxide powders-Spray Pyrolysis", retrieved Oct. 2009, 2 pages.

Rahaman ("Ceramic Processing", published 2006), 1 page.

Grill, Diamond-Like Carbon: State of the Art, Diamond and Related Materials, Jul. 18, 1998, pp. 428-434.

"Hybrid AC EL Structures with Thin Protective ZnO Film", Tsvetkova et al., Journal of Physics: Conference Series 113 (2008), pp. 1-4.

"Feasibility Study of RF Sputtered ZnO Film for Surface Micromachining", Bhatt et al., Surface & Coatings Technology, 198 (2005), pp. 304-308.

"Low-Emissivity Coating of Amorphous Diamond-Like Carbon/Ag-Alloy Multilayer on Glass" Chiba et al., Applied Surface Science 246 (2005) pp. 48-51.

Carl C. Koch, "Nanostructured Materials," Processing, Properties, and Applications, Second Edition, Ebook copyright Elsevier 2017, pp. 1-785.

* cited by examiner

COATED ARTICLE INCLUDING NOBLE METAL AND POLYMERIC HYDROGENATED DIAMOND LIKE CARBON COMPOSITE MATERIAL HAVING ANTIBACTERIAL AND PHOTOCATALYTIC PROPERTIES, AND/OR METHODS OF MAKING THE SAME

TECHNICAL FIELD

Certain example embodiments of this invention relate to coated articles having antibacterial and photocatalytic properties, and/or methods of making the same. More particularly, certain example embodiments of this invention relate to coated articles including noble metal (e.g., Ag) and polymeric hydrogenated diamond like carbon (e.g., a-C:H) composite materials having antibacterial and photocatalytic properties, and/or methods of making the same.

BACKGROUND AND SUMMARY

Vehicle windows (e.g., windshields, backlites, sunroofs, and sidelites) are known in the art. For purposes of example, vehicle windshields typically include a pair of bent glass substrates laminated together via a polymer interlayer such as polyvinyl butyral (PVB).

Insulating glass (IG) windows are also known in the art. Conventional IG window units include at least first and second glass substrates (one of which may have a solar control coating on an interior surface thereof) that are coupled to one another via at least one seal and/or spacer. The resulting space or gap between the glass substrates may or may not be filled with gas and/or evacuated to a low pressure in different instances. Many IG units are thermally tempered. Monolithic architectural windows for use in homes or building are also known in the art. Fixture windows in homes such as shower stall windows may be made of glass sheets. Again, monolithic windows are often thermally tempered for safety purposes.

Other types of coated articles also are sometimes subjected to heat treatment (HT) (e.g., tempering, heat bending, and/or heat strengthening) in certain applications. For example and without limitation, glass table tops, picture frame covers, and the like may be subject to HT in certain instances.

Germs are becoming of increasing concern across the world, especially in view of the large amount of international travel taking place in today's society. There exists a need in the art for coated articles for use in windows, table tops, and/or the like that are capable of killing germs, viruses, and/or bacteria, thereby reducing the likelihood of persons becoming sick. It also would be advantageous if such characteristics of a coated article could be combined with self-cleaning properties.

It will be appreciated that there exists a need in the art for a coated article (e.g., for use in a window, shower door, table-top glass, and/or the like) having antifungal and/or antibacterial properties. It also may also be desirable for the coated article to have self-cleaning properties. Furthermore, it would be desirable to provide a coated article that can function to kill certain bacteria and/or fungus that come into contact with the coated article, thereby reducing the chances of persons becoming sick, while also being self-cleaning to reduce the amount of maintenance required with respect to cleaning the glass.

Antibacterial coatings and photocatalytic coatings are known. See, for example, U.S. Pat. Nos. 8,221,833 and 7,846,492, as well as U.S. Publication Nos. 2012/0114878 and 2011/0256408, the entire contents of each of which is hereby incorporated herein by reference. As noted above, it would be desirable to combine antibacterial and photocatalytic properties. It also would be desirable to extend the life of such products, e.g., by providing more controlled leaching of the antibacterial materials from the coating, etc.

Certain example embodiments address these and/or other concerns.

In certain example embodiments, a coated article is provided. The coated article includes a glass substrate. A matrix comprising diamond-like carbon (DLC) and silver is formed, directly or indirectly, on the glass substrate. The DLC may be a-C:H, a-C:H:O, or the like, in different example embodiments. A layer comprising titanium oxide is formed, directly or indirectly, on the matrix. The matrix is structured to enable silver ions produced from the silver therein to migrate towards the layer comprising titanium oxide, and the layer comprising titanium oxide is structured to enable the silver ions migrating from the matrix to pass therethrough. The layer comprising titanium oxide may have a substantially anatase phase and be photocatalytic in certain example embodiments and, optionally, it may be doped with carbon and/or include nitrogen. According to certain example embodiments, a proton-conducting thin film layer may be located between the matrix and the layer comprising titanium oxide, e.g., with the proton-conducting thin film layer comprising zirconium oxide and potentially also carbon and/or nitrogen. A buffer layer optionally may be located between the matrix and the glass substrate in certain example embodiments. A plurality of channels may be formed in the layer comprising titanium oxide, with the channels facilitating migration of the silver ions from the matrix through the layer comprising titanium oxide, in addition to or in place of migration being facilitated by virtue of the morphology of the layer comprising titanium oxide.

In certain example embodiments, a coated article is provided. The coated article includes a glass substrate. A buffer layer is formed, directly or indirectly, on the glass substrate. A matrix comprising DLC and silver is formed, directly or indirectly, on the buffer layer. The DLC may be a-C:H, a-C:H:O, or the like, in different example embodiments. An overcoat layer comprising zirconium oxide is formed, directly or indirectly, on the matrix. The matrix is structured to enable silver ions produced from the silver therein to migrate towards the layer comprising zirconium oxide, and the layer comprising zirconium oxide is structured to enable the silver ions migrating from the matrix to pass therethrough. In certain example embodiments, the buffer layer may be doped with C and/or the layer comprising zirconium oxide may comprise C and/or N. A plurality of channels may be formed in the layer comprising zirconium oxide, with the channels facilitating migration of the silver ions from the matrix through the layer comprising zirconium oxide, in addition to or in place of migration being facilitated by virtue of the morphology of the layer comprising zirconium oxide.

In certain example embodiments, a method of making a heat treated coated article is provided. The method includes having a glass substrate with a multilayer coating and a protective film thereon, with the multilayer coating including one or more layers comprising Ag, with each said layer comprising Ag being sandwiched between layers comprising carbon, with the protective film being provided over an uppermost layer of the multilayer coating, with the protective film including a release layer and a barrier layer, with the release layer and the barrier layer being of different materials, and with the release layer being between the uppermost layer of the multilayer coating and the barrier layer. The glass substrate with multilayer coating and the protective film thereon is heat treated using a temperature of at least 550 degrees C. so that (a) during the heat treating, the protective film prevents significant burn-off of carbon from the layers comprising carbon and prevents significant oxidation of the Ag, (b) as a result of the heat treating, the layers comprising carbon and the at least one layer comprising Ag in the multilayer coating are transformed into a composite matrix including carbon and Ag islands therein and at least part of the protective film is removed from the coated article.

In certain example embodiments, a method of making a heat treated coated article is provided. A multilayer coating is formed on a glass substrate, with the multilayer coating including one or more layers comprising Ag, and with each said layer comprising Ag being sandwiched between layers comprising carbon. A protective film is formed on the multilayer coating, with the protective film being provided over an uppermost layer of the multilayer coating, with the protective film including a release layer and a barrier layer, with the release layer and the barrier layer being of different materials, and with the release layer being between the uppermost layer of the multilayer coating and the barrier layer. The glass substrate with multilayer coating and the protective film thereon is heat treated using a temperature of at least 550 degrees C. so that (a) during the heat treating, the protective film prevents significant burn-off of carbon from the layers comprising carbon and prevents significant oxidation of the Ag, (b) as a result of the heat treating, the layers comprising carbon and the at least one layer comprising Ag in the multilayer coating are transformed into a composite matrix including carbon and Ag islands therein and at least part of the protective film is removed from the coated article.

In certain example embodiments, a heat treatable coated article (e.g., an intermediate product) is provided. A glass substrate supports a multilayer coating and a protective film over the multilayer coating. The multilayer coating includes one or more layers comprising Ag, with each said layer comprising Ag being sandwiched between layers comprising carbon. The protective film is provided over an uppermost layer of the multilayer coating, with the protective film including a release layer and a barrier layer, with the release layer and the barrier layer being of different materials, and with the release layer being between the uppermost layer of the multilayer coating and the barrier layer.

Methods of making these and/or other coated articles are also contemplated herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to coated articles including noble metal (e.g., Ag) and polymeric hydrogenated diamond like carbon (e.g., a-C:H) composite materials having antibacterial and photocatalytic properties, and/or methods of making the same.

In this regard, certain example embodiments involve the controlled leaching of ions from a noble metal (e.g., Ag ions) through stress engineering, e.g., to make an improved antibacterial and/or antimicrobial layer stack, which also may be self-cleaning in some instances. Very thin films of a noble metal are cladded between polymeric hydrogenated diamond like carbon layers (a-C:H). Noble metals are known to resist corrosion and oxidation (e.g., in moist air) and include, for example, Ag, Pt, Au, Cu, among others. The very thin films in certain example embodiments are 1-25 nm thick, more preferably 1-10 nm thick, and still more preferably 1-5 nm thick. As noted above, Ag is used in certain example embodiments, e.g., because of its known antibacterial and antimicrobial properties.

The a-C:H preferably possesses a high bandgap (e.g., >3 eV), which may be achieved by using a precursor with a high H-to-C ratio and requires low energy to ionize and dissociate into radicals, thus allowing the a-C:H formed to incorporate a hydrogen content of least 30 at. % and have small $sp^2$ clusters or no or substantially no C ring structures.

By varying the thickness ratio of the metal layer to the a-C:H, it is possible to tune the structure of the metal/polymeric DLC composite coating so as to vary the mechanical as well as electro-optical properties of the final stack. In addition, by controlling the energy of the depositing atoms, it is possible to affect the net biaxial stress in a manner so as to directly influence the metal island morphology of the silver and its long-term stability within the multilayer structure. Furthermore, heat treatment of the stack can also be used to homogenize the multilayer into a composite of C and Ag.

By oxidizing the hydrogenated C network, O can be incorporated in the carbon matrix. This, in turn, can help create a hydrophilic matrix of C, which facilitates diffusion of Ag therethrough. Heating also modulates the silver spatial distribution throughout the entire stack and increases the optical transmission. Heating in air incorporates oxygen in the a-C:H and also decreases the amount of graphitic centers.

Figure 1:
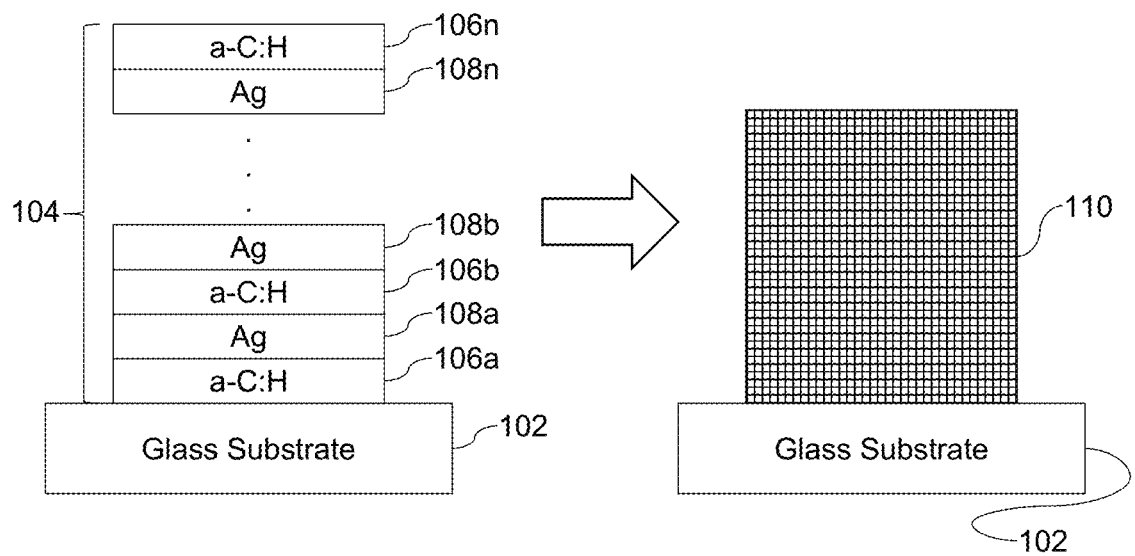
FIG. 1 demonstrates how noble metal inclusive layers cladded between a-C:H inclusive layers can be transformed into a metal/polymeric DLC composite coating, in certain example embodiments.
Figure 2A:
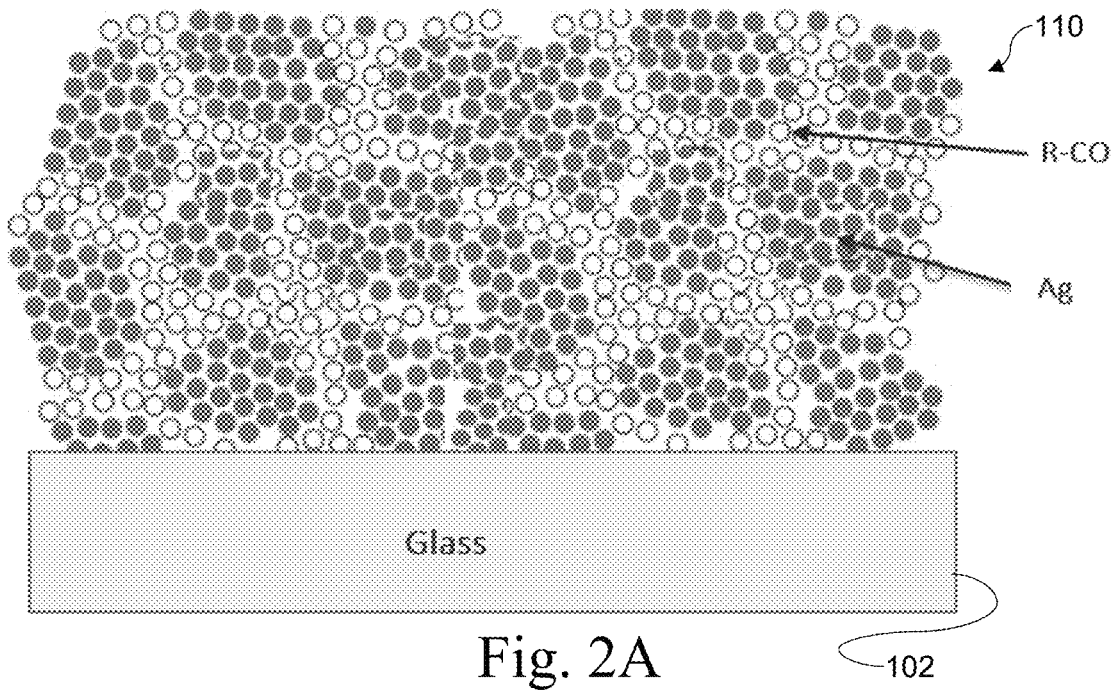
FIG. 2A is an enlarged, schematic view of an a-C:H(O)/Ag nano-composite layer on a glass substrate, which may be formed in connection with certain example embodiments.

In line with the above, FIG. 1 demonstrates how noble metal inclusive layers cladded between a-C:H inclusive layers can be transformed into a metal/polymeric DLC composite coating, in certain example embodiments. As shown in FIG. 1, a glass substrate 102 supports an initial layer stack 104. The initial layer stack 104 includes a plurality of a-C:H inclusive layers 106a-106n, and a plurality of Ag inclusive layers 108a-108n. In the example initial layer stack 104 shown in FIG. 1, the a-C:H inclusive layer 106a is the layer closest to the substrate 102, and a-C:H inclusive layer 106n is the outermost layer of the initial layer stack 104. It will be appreciated that this need not be the case in all example embodiments. In the FIG. 1 example arrangement, the initial thickness of the initial layer stack 104 $T_i$ is equal to $n \times t_{DLC} + m \times t_{Ag}$, where $m=n-1$, n is the number of DLC-inclusive layers, m is the number of Ag-inclusive layers, $t_{DLC}$ is the thickness of each DLC-inclusive layer, and $t_{Ag}$ is the thickness of each Ag-inclusive layer. Upon the application of heat, the composite matrix 110 is produced, and it has a final thickness of $T_f$. See, for example, FIG. 2A, which is an enlarged, schematic view of the a-C:H(O)/Ag nano-composite layer 110 on the glass substrate 102, which may be formed in connection with certain example embodiments. Heat treatment in the 580-650 degree C. range (more preferably the 630-640 degree C. range) for 1-20 min. (more preferably 1-10 min., still more preferably 4-7 min.) has been found to be effective in creating the nano-composite layer 110 from the initial layer stack 104.

Figure 2B:
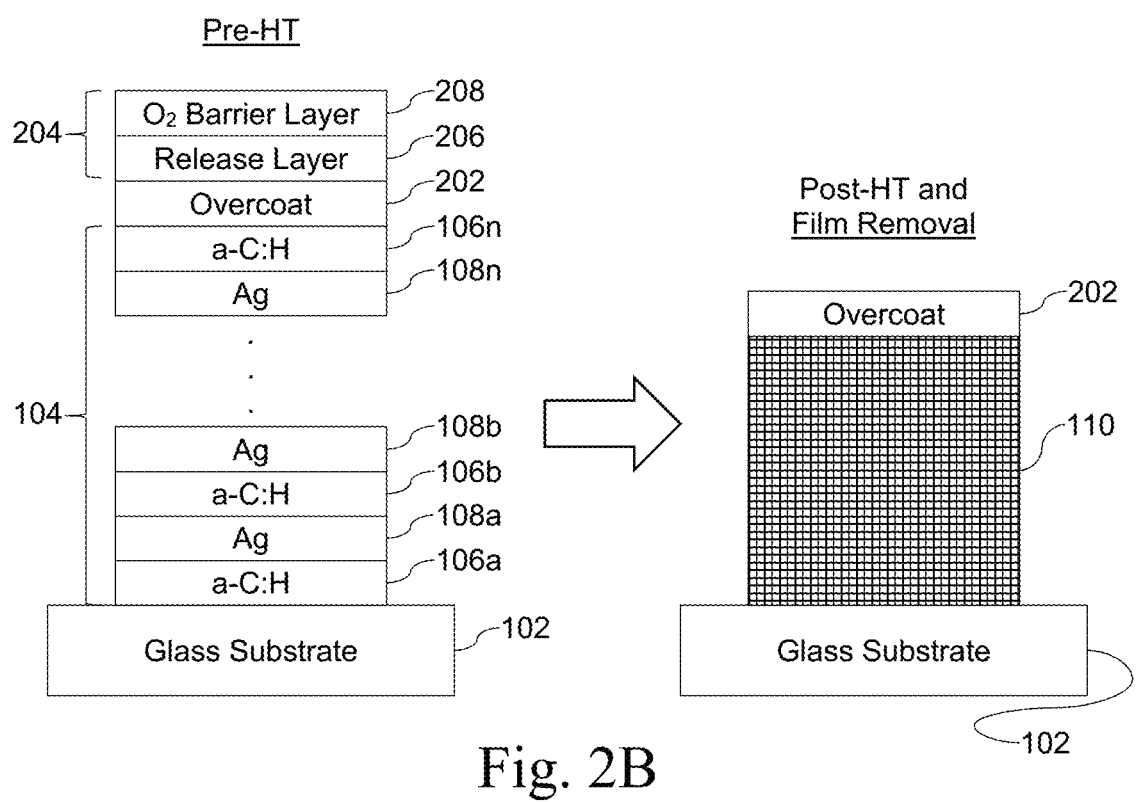
FIG. 2B is similar to FIG. 1 and demonstrates how heat treatment can be used in creating a metal/polymeric DLC composite coating, in connection with certain example embodiments.

FIG. 2B is similar to FIG. 1 and demonstrates how heat treatment can be used in creating a metal/polymeric DLC composite coating, in connection with certain example embodiments. As will be appreciated from FIG. 2B, the heat treatment of the initial layer stack 104 is performed with a surface protection coating (SPC) 204 thereon. The SPC 204 is formed over the initial layer stack 104, and an overcoat layer 202 may be interposed therebetween. The overcoat layer 202 is described in greater detail below, e.g., in connection with the layer comprising titanium oxide 308 and the overcoat comprising zirconium oxide 604. The SPC 204 is a sacrificial coating that helps protect the underlying layers in the initial layer stack 104 from excess oxidation and/or removal during the relatively high temperature process involved in the formation of the composite matrix 110. For instance, the SPC 204 may help reduce the likelihood of the Ag in the Ag inclusive layers 108a-108n from being oxidized. Moreover, as is known, DLC tends to oxidize and burn off at temperatures of from approximately 380-400 degrees C., as the heat treatment is typically conducted in an atmosphere including oxygen, even though temperatures of these levels and/or higher might be useful in forming the composite matrix 110. The SPC 204 therefore is useful in these regards.

The SPC 204 may be formed and/or used in a manner similar to that used to enable "temperable DLC" as in shower door, skylight, vehicle window, and/or other applications. See, for example, U.S. Pat. Nos. 8,443,627; 7,964, 238; and 7,914,857; the entire content of each of which is hereby incorporated herein by reference.

The SPC 204 is a sacrificial coating removed as a result of heat treatment. In certain example embodiments, it includes a release layer 206 and an oxygen barrier or blocking layer 208, with the release layer 206 being closer to the initial layer stack 104 compared to the oxygen barrier or blocking layer 208. An example advantage of using distinct and different oxygen-blocking and release layers in the SPC 204 is that each layer of this protective film can be optimized for its intended function. Consequently, the optimized performance of the SPC 204 may be improved and it can be made thinner if desired. In certain embodiments, the sacrificial SPC 204 is formed on the glass substrate 102 over the a-C:H inclusive layers 106a-106n and the Ag inclusive layers 108a-108n, so as to reduce the likelihood of these layers burning off during heat treatment and/or becoming over-oxidized, and so as to increase the likelihood of the formation of a high-quality composite matrix 110, even though temperatures well above the burn-off temperature of DLC may be used in some instances.

The use of zinc and/or zinc oxide in sacrificial SPC 204 is/are beneficial with respect to reducing and/or preventing oxygen diffusion into the underlying DLC during heat treatment and/or into the composite matrix 110 as it is being formed. In the FIG. 2B example, the release layer 206 may be zinc inclusive, and the oxygen barrier layer 208 may be zinc oxide inclusive. The release layer 206 may be metallic, substantially metallic, or sub-stoichiometric zinc oxide in different example embodiments, whereas the oxygen barrier layer 208 may be of or including zinc oxide in certain example embodiments of this invention. In certain example embodiments, the release layer 206 is more metallic (and thus contain less oxygen) than the oxygen barrier layer 208, regardless of the materials used therein. An oxygen "blocking" or "barrier" layer means that the layer blocks significant amounts of oxygen from reaching the DLC during HT, and/or from reaching the composite matrix 110 as it is being formed.

In certain example embodiments, layer 206 may be of or include $ZnO_y$ and layer 208 may be of or include $ZnO_x$, where $x>y$ (i.e., layer 208 contains more oxygen than layer 206). Moreover, in certain example embodiments, y is from about 0 to 0.9, more preferably from about 0.1 to 0.9, even more preferably from about 0.1 to 0.8, and possibly from about 0.1 to 0.7. Meanwhile, in certain example embodiments, x is greater than y, and x is from about 0.3 to 1.0, more preferably from about 0.3 to 0.99, even more preferably from about 0.5 to 0.95, and possibly from about 0.6 to 0.90. Thus, it will be appreciated that in certain example instances, both layers 206 and 208 may be of or include zinc oxide, and both layers 206 and 208 may be sub-stoichiometric.

The use of zinc oxide layer 206 that is more metallic than zinc oxide layer 208 permits more efficient and easier removal of the SPC 204 during and/or following heat treatment (HT). In other words, layer 206 is a release layer. The different compositions of zinc oxide inclusive layers 206 and 208 causes different stresses in layers 206 and 208, which stresses are manipulated so as to allow the SPC 204 to be more easily removed during and/or following HT. Zinc oxide is an advantageous material for SPC 204 because it can be easily removed (e.g., using water and/or vinegar) during and/or following HT in a non-toxic manner.

As noted above, one or both of layers 206 and 208 may be sub-stoichiometric. This is advantageous for oxygen gettering purposes during HT. If the layers 206 and 208 are too oxided (e.g., fully stoichiometric) prior to HT, then oxygen can diffuse through it. However, the sub-stoichiometric nature of layer(s) 206 and/or 208 permits the material therein to getter oxygen during HT, so that at least layer 206 (and possibly layer 208) does not burn off during HT. It is noted that the upper layer 208 may or may not burn off (entirely or partially) during HT in different example embodiments. It is noted that another example advantage of sub-stoichiometric materials (compared to fully stoichiometric materials) is that they can be deposited (e.g., via sputtering or the like) more quickly. One or both of layers 206 and 208 may be sputter-deposited in a sub-stoichiometric form, in any suitable manner, e.g., by varying oxygen gas flow in the sputtering chamber(s).

In certain example embodiments, release layer 206 (e.g., of zinc or sub-stoichiometric zinc oxide) may be deposited (e.g., via sputtering) so as to be from about 5-2,000 nm thick, more preferably from about 5-300 nm thick, even more preferably from about 10-100 nm thick, with an example thickness being from about 10-30 nm. In certain embodiments, zinc oxide inclusive layer 208 may be deposited (e.g., via sputtering) so as to be from about 20-1,000 nm thick, more preferably from about 50-500 nm thick, more preferably from about 100-300 nm thick, with an example thickness being about 200 nm. More metallic layer 206 may be thicker than less metallic layer 208 in certain example embodiments; layer 206 may be at least twice as thick as layer 208 in certain example instances prior to HT. A preferred thickness of overall sacrificial SPC 204 in certain example embodiments is less than about 1,000 nm, more preferably less than about 300 nm, and most preferably less than about 100 nm.

It will be appreciated that the two-layer arrangement described above for the SPC 204 may be replaced with a layer that is oxidation graded (continuously or non-continuously) through its thickness. In such cases, for example, the SPC 204 may include more oxygen at a location further from the initial layer stack 104 than at another location in the film closer to the initial layer stack 104.

An advantage of using zinc and/or zinc oxide in the SPC 204 relates to its ease of removal after HT. Protective layers such as silicon nitride are sometimes undesirable, as they may require complex etching in order to remove the same after HT. On the other hand, when SPC 204 is made of zinc and/or zinc oxide, it is soluble in vinegar and/or water (possibly only water with no vinegar required in certain preferred embodiments), and the application of vinegar and/or water allows portions of the SPC 204 remaining after HT to be easily removed in a non-toxic manner. Again, in certain example embodiments, it is possible to remove the zinc oxide with only water (no vinegar needed) in certain instances, which is advantageous from a cost and processing point of view. In certain example instances, rubbing with such liquids may be beneficial in removing SPC 204 after HT when the coated article is still warm therefrom (e.g., when the remaining SPC 204 is from about 80-200 degrees C., more preferably from about 100-180 degrees C.; although the removal may also take place at room temperature in certain example embodiments).

Although the release layer 206 and the oxygen barrier layer 208 have been described as incorporating zinc, other materials may be used together with or in place of zinc in different example embodiments. For example, the oxygen barrier layer 208 may be of or include a material selected from the group consisting of: zinc oxide, silicon carbide, aluminum nitride, boron oxide, aluminum oxide, aluminum oxynitride, silicon nitride, silicon oxide, silicon oxynitride, and mixtures thereof. In certain example embodiments, the oxygen barrier layer 208 is designed to be about as hard and/or durable as glass.

The release layer 206 may be of any suitable material that dissolves or readily reacts with water, vinegar, or bleach. The release layer 206 preferably has a melting point (or dissociation temperature) above 580 or 600 degrees C. in certain example embodiments. The release layer 206 may be of or include oxides, sub-oxides, nitrides and/or sub-nitrides of boron, titanium boride, magnesium, zinc, and mixtures thereof.

In one example, the oxygen barrier layer 208 comprises silicon carbide and the release layer 206 comprises a sub-oxide of magnesium. After heat treatment or HT (e.g., tempering), the product is exposed to a mildly reactive liquid (e.g., water, vinegar, dilute ammonia and/or bleach), and the liquid penetrates through to the release layer 206 via pinholes or grain boundaries in the overlying layer(s) and causes the release layer to disband from the composite matrix 110 thereunder. Thus, the release layer 206 and the oxygen barrier layer 208 are removed following the HT. Hot water is a particularly good release liquid for use with these materials. The oxygen barrier layer 208 may be about 28 nm thick, and the release layer may be about 19 nm thick in certain example embodiments.

In another example, the release layer 206 is of or includes a sub-oxide of zinc (ZnOx), and the oxygen blocking or barrier layer 208 is of or includes aluminum nitride (AlN). After heat treatment or HT (e.g., tempering), the product is exposed to a mildly reactive liquid (e.g., water, vinegar, dilute ammonia and/or bleach), and the liquid penetrates through to the release layer 206 via pinholes or grain boundaries in the overlying layer(s) and causes the release layer to disband from the composite matrix 110 thereunder. Thus, the release layer 206 and the oxygen barrier layer 208 are removed following the HT. Vinegar is a particularly good release liquid for use with these materials. The oxygen barrier layer 208 may be about 20 nm thick, and the release layer may be about 50 nm thick in certain example embodiments.

In still another example, the release layer 206 is of or includes a sub-oxide of Mg (MgOx), and the oxygen blocking or barrier layer 208 is of or includes aluminum nitride (AlN). After heat treatment or HT (e.g., tempering), the product is exposed to a mildly reactive liquid (e.g., water, vinegar, dilute ammonia and/or bleach), and the liquid penetrates through to the release layer 206 via pinholes or grain boundaries in the overlying layer(s) and causes the release layer to disband from the composite matrix 110 thereunder. Thus, the release layer 206 and the oxygen barrier layer 208 are removed following the HT. Hot water is a particularly good release liquid for use with these materials. The oxygen barrier layer 208 may be about 20 nm thick, and the release layer may be about 23 nm thick in certain example embodiments.

In certain example embodiments, release layer 206 is more dissolvable than is oxygen barrier layer 208 in water, vinegar, bleach and/or the like. Moreover, in certain example embodiments, oxygen barrier layer 208 is more of a barrier to oxygen and/or is harder than is release layer 206.

Although not shown in FIG. 2B, a thin protective layer comprising DLC, silicon nitride, aluminum nitride, or silicon aluminum nitride, for example, may be provided over (or as an uppermost part of) sacrificial SPC 204 prior to HT, for durability and/or oxygen barrier purposes. Once the SPC 204 is removed, the overcoat 202 (if provided) is left on the a-C:H(O)/Ag nano-composite matrix 110.

The heat treatment is very beneficial to creating an overall film structure for the composite matrix 110 in which Ag islands form between the DLC. Again, see FIG. 2A in this regard. The SPC 204 may be desirable in some instances, as it has been found that the an overcoat comprising TiOx and/or ZrOx will not always be sufficient to serve as oxygen barriers. This is surprising and unexpected. Thus, the materials noted above (including especially AlN, SiN, diborides, etc.) may be useful for inclusion in a sacrificial surface protection layer, even though an overcoat comprising TiOx and/or ZrOx is provided thereunder.

It will be appreciated that some intermixing of Ti and/or Zr from the overcoat 202 may be mixed into the matrix 110 as a result of the heat treatment. This might actually be advantageous in some instances, as Ti and/or Zr also can exhibit antimicrobial properties and may migrate through the matrix in a manner similar to the Ag, as described herein. In fact, in certain example embodiments, some or all of the layers comprising Ag 108a-108n may further include Ti and/or Zr, e.g., for aiding in antimicrobial performance. The Ti and/or Zr may be co-sputtered with the Ag, formed in connection with an ion beam, etc., in such embodiments.

Following application of the surface protection coating and upon heating the a-C—H/Ag multilayer with an overcoat comprising TiOx and/or ZrOx (which may be highly sub-oxidic as initially deposited in certain example embodiments), a nano-composite of Ag and Ti is formed in an amorphous carbon matrix. The final product obtained has advantageous optoelectronic, photocatalytic, and/or antimicrobial properties and can be used in many fields of glass usage and type. It contains silver islands, sometimes with titanium embedded with the silver in those islands. They may demonstrate nano- or micro-galvanic effects that give rise to controlled antibacterial activity. It is surmised that the excellent beneficial properties is related to the micro-galvanic effect between the silver nano-islands below the overcoat.

Another mechanism that could be at work in addition to an electrochemical redox process (described in greater detail below) involves the generation of nano- and micro-electric fields in the nano-composite. In contrast, the surface of metallic silver has only a slight antimicrobial effect because of its chemical stability, so it is not always as useful as an antibacterial surface coating. In certain example embodiments, however, the new microstructure formed upon heating is highly advantageous. In certain example embodiments, this microstructure may enable migration of Ag+ ions that are more effective antimicrobial agents. Furthermore, certain example embodiments form a new silver-a-C:HO—Ti-TiOx material in which the distance between the Ag and Ti/TiOx particles preferably is less than 0.1 nm. This then helps ensure a high local strength of the microelectric fields, as a potential difference over a short distance can give high field strengths (~1 V/μm). In fact, it is surmised that the two mechanisms can act in tandem, whereby the redox processes and electric field generation act in a manner that is detrimental to bacterial population growth, via the release of toxic levels of silver ions from the bulk to the surface. The role of the hydrophillic a-C—H(O) is provide the ingress of water molecules useful for the above reactions to take place, also described in greater detail below.

As noted above, the thickness ratio between the a-C:H inclusive layers 106a-106n and the Ag inclusive layers 108a-108n may be used to control the amount of Ag loaded into the nano-composite layer 110. In certain example embodiments, each a-C:H inclusive layer 106a-106n as shown at the left side of FIG. 1 may be 2-10 nm thick and each Ag inclusive layer 108a-108n as shown at the left side of FIG. 1 may be 0.5-2 nm thick. Although not shown in FIG. 2A or FIG. 2B, as described herein, there may be a gradient in Ag distribution throughout the "supper-lattice" layer 110, as enabled by, for example, varying the layer thicknesses and/or thickness ratios.

In this latter regard, the example described and shown in connection with FIG. 1 involves a structure in which the DLC-inclusive layers have a common thickness, and the Ag-inclusive layers have another common thickness. However, this need not necessarily be the case. For example, the structure can be intentionally deposited so as to create a gradient in silver concentration in the final coating. This gradient may be created by decreasing the thickness of the Ag-inclusive layers for layers moving towards the surface of the stack.

The embedded metal nanoparticles are often affected by changes in their size and shape distributions. There are several mechanisms of their restructuring, namely: atomic diffusion along the particle surface (recrystallization and coalescence) and through the matrix (Ostwald ripening), and particle migration. All of these factors may be further enhanced by thermal activation during high temperature treatment or by laser or electron irradiation.

DLC may be formed by any suitable means. See, for example, U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, each of which is hereby incorporated herein by reference. In certain example embodiments, the DLC-inclusive layers may be ion beam deposited at a low power, and the Ag-inclusive layers may be sputter deposited. Prior to formation of the initial (or each) DLC-inclusive layer, it may be desirable to clean the substrate with oxygen and/or Ar, plasma ashing, and/or the like. As will be appreciated by those skilled in the art, DLC may be grown from a carbon source such as, for example, acetylene, methane, and/or the like. By way of example, an ion beam may be used to form the a-C:H inclusive layers 106a-106n, with the following example parameters:

| Passes | CH4 (sccm) | Voltage (V) | Current (A) | Power (W) |
|--------|-----------|-------------|-------------|-----------|
| 3 | 100 | 1200 | 0.28 | 336 |
| 6 | 100 | 1400 | 0.30 | 420 |
| 9 | 100 | 1800 | 0.49 | 882 |
| 3 | 150 | 2000 | 0.84 | 1680 |
| 6 | 150 | 3000 | 0.94 | 2820 |
| 9 | 150 | 3000 | 0.95 | 2850 |

The amount of Ag loaded in the polymeric DLC matrix may be controlled to a desired level of 5%-30% or more (e.g., up to perhaps as high as 60% or higher), depending on the application as explained in greater detail below, e.g., at 5% intervals. This may be accomplished by varying the thickness ratios of the DLC-inclusive layers and the Ag-inclusive layers, altering the number of layers, etc. Gradients in the silver content may be formed in this way, e.g., as noted above, and having more Ag towards the substrate and less Ag moving away from the substrate may help encourage the outward migration of $Ag^+$ ions when the layer is activated. The heat treatment may aid in formation of the matrix, as well as in encouraging the incorporation of oxygen therein. Increasing the oxygen content in the matrix may help slow the breakdown of the DLC when it is exposed to sunlight.

Generally, the amount of metal determines the final Ag leaching properties of such a composite material. When the amount of metal in the film is low, metal nano-sized islands are separated from each other in the plasma-polymer matrix, and the coatings behave mostly as electrical insulators. On the other hand, the separation vanishes with a high amount of metal inclusions, and the character of the films resembles conductors. The gradient intermediate phase between these two structural regimes is called the percolation threshold.

The structure of a metal/plasma polymer nano-composite coating is typically described by a so called "filling factor" f (volume fraction ratio). It is defined as the volume of metal inclusions embedded in a plasma polymer matrix in the total volume of the composite material. In certain example embodiments, the matrix may be thought of as including DLC and Ag nano-islands/metal island layers.

The coated article including the composite coating 110 can potentially find commercial application where the metal/plasma polymer films might require either long-term stability of the coating or its controlled aging over the period of application, e.g., in terms of metal ion release or matrix degradation. Concerns about potential instability of the structure of metal/plasma polymer coatings can be considered one of the main reasons why these materials have in the past failed to be widespread in industrial applications requiring stable coatings. Both the a:C—H polymer matrix and the metallic component of the composite are prone to aging, if left exposed to environmental factors such as UV and humidity. For example, the plasma polymer matrix typically undergoes several structural changes when exposed to the ambient atmosphere after deposition because of the presence of free radicals, structural defects or residual stress.

In certain example embodiments, UV-induced photo-ablative oxidation of the hydrocarbon matrix containing Ag (in the presence of moisture) is believed to be the predominant process that initiates Ag ion release. In addition to UV, oxygen and water vapor are believed to be necessary active oxidative agents.

The various processes taking place in water and aqueous media are rather complex. The initiation of the $Ag^+$ ion release requires a Ag(0) island to be oxidized. The oxidation process in turn requires the presence of both dissolved oxygen and protons from a low-pH medium. It produces reactive oxygen intermediates and might even proceed to a complete reactive dissolution under some conditions and disappearance of the solid nanoparticle phase. In general, some reactions involved include:

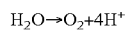

$$H_2O \rightarrow O_2 + 4H^+$$

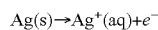

$$Ag(s) \rightarrow Ag^+(aq) + e^-$$

$$H^+ + e^- \rightarrow H$$

Controlled aging of the above-described composite coating benefits from proper selection of metal and matrix materials, and precise tuning of their structures. This can be of particular importance, for example, in biomedical applications that need antibacterial silver-containing composites with controlled $Ag^+$ ion release.

The reaction of a silver nanoparticle with $H_2O_2$ is even faster than with $O_2$, so the initial Ag oxidation via reaction with oxygen is believed to be the rate limiting factor. Rates of $Ag^+$ ion release increase with temperature and decrease with increasing pH. The value of pH can be further influenced by the potential degradation of the a-C:H polymer and its resulting products. The released $Ag^+$ ions can be re-adsorbed on silver nano-island or particle surfaces (and be reduced by them, e.g., via Ostwald ripening in the case of plasma polymer nano-composites), so even simple colloids contain at least three forms of silver: solids (AgO), free $Ag^+$ ions or their soluble complexes, and surface-adsorbed $Ag^+$ with the possible occurrence of Ag oxides. Overall, the tendency towards nano-structural changes (including their rate and overall measure) is believed to be to a great extent determined by the matrix material, its chemical structure, stability, glass transition, and crosslinking. The wettability and ability of the matrix to take up water is believed to be critical for both the aging of the polymer (e.g., possible hydrolysis of the backbone chain), as well as for the structural modifications of the metal nano-islands. The silver ion release was found to increase exponentially with the maximum water absorption by the polymer matrix and the diffusion coefficient of water within the matrix. Further, the $Ag^+$ release rate decreases with increasing crosslinking of the matrix, and also its efficiency is higher in hydrophilic polymers compared to hydrophobic polymers. An increasing crystallinity of the matrix was found to decrease the $Ag^+$ release. All of these parameters affect the diffusion coefficients of water molecules, as well as the $Ag^+$ ions through the polymer matrix.

In order to achieve a more controlled leaching/release of Ag ions and degradation of the matrix, a layer comprising titanium oxide (e.g., $TiO_2$ or other suitable stoichiometry) also can be deposited on the Ag/a-C:H composite. This top layer helps encapsulate and shield the composite layer from rapid changes in environment. Another advantage to this overcoat relates to its ability to confer a hydrophillic or super-hydrophillic surface that also is anti-fouling (self-cleaning) surface when exposed to sun light. The crystallinity of the $TiO_2$ structure aids in forming grain boundaries through which protons formed from the photocatalytic effect of $TiO_2$ in the presence of water and sunlight can channel or diffuse to the Ag so as to ionize the latter, thus producing $Ag^+$ ions. It is noted that the carbon in the various layers may play an advantageous role in terms of moving $Ag^+$ ions from site-to-site within the matrix, e.g., along the grain boundaries. The abundance of $H^+$ ions aids in allowing the Ag to donate electrons in order to produce Hz. The silver ions can then diffuse to the surface. The changes in the structure and properties of the silver-containing coatings during aging in air or in water may be achieved with respect to amorphous hydrophobic matrices (e.g., hydrocarbon, Ag/a-C:H, etc.), as well as with respect to hydrophilic matrices (e.g., oxygenated hydrocarbon, Ag/a-C:H:O, or organosilicon, Ag/a-C:Si:O, etc.). These matrices may be used in certain example embodiments.

In addition to the matrix material, the overall film architecture plays a role in how the Ag ions reach the surface. For example, plasma polymer multilayer films with metal nanoparticles buried in-between typically show a good long-term stability, particularly for Au/C:H systems. Certain example embodiments incorporate Ag/a-C:H:O nano-composite coatings with a broad range of microstructures around the percolation threshold, e.g., to leverage this long-term stability and also harness antibacterial and/or anti-fungal properties. The aging (in air and/or in water) of different a-C:H:O plasma polymer films also may be advantageous. A rather stable plasma polymer matrix deposited from $CO_2/CH_4$ discharges, for example, may be used with the Linera ion beam in diffused mode. In any event, by using an overcoat layer comprising $TiO_2$, certain example embodiments achieve good long-term aging with respect to the Ag nano-islands embedded in such plasma polymer films in ambient air, and the layer comprising $TiO_2$ adds more functionality to the entire stack as noted above.

Figure 3:
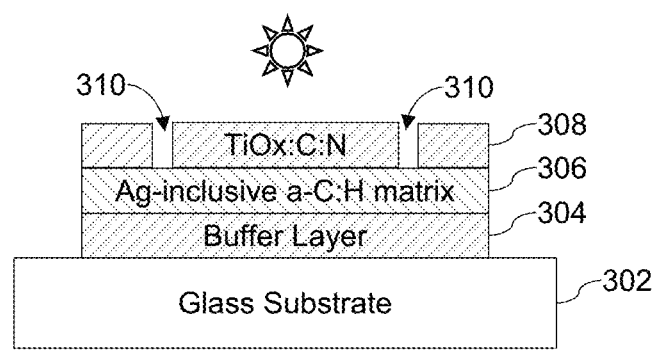
FIG. 3 is a schematic, cross-sectional view of a coated article having antibacterial and antimicrobial properties, in accordance with an example embodiment.

FIG. 3 is a schematic, cross-sectional view of a coated article having antibacterial and antimicrobial properties, in accordance with an example embodiment. A glass or other substrate 302 supports a buffer layer 304, which helps block Na migration from the substrate 302 into the layer(s) above it. In certain example embodiments, the buffer layer 304 may be a silicon-inclusive layer such as, for example, silicon oxide, silicon nitride, silicon oxynitride, and/or the like. In certain example embodiments, the buffer layer 304 may include aluminum (e.g., 5-10% Al). A silver-inclusive a-C:H matrix 306 is provided over the buffer layer 304, and this matrix 306 may be made using the techniques described above (e.g., in connection with claim 1). In certain example embodiments, the Ag may be implanted in the a-C:H matrix using an ion beam, alternating layers of a-C:H and Ag may be formed, etc. As noted above, the Ag content may be graded, e.g., such that more Ag is provided proximate to the substrate 302, with decreasing amounts of Ag being present in the matrix 306 moving away from the substrate 302, e.g., thereby encouraging the outward migration of $Ag^+$ ions.

A layer comprising titanium oxide (e.g., $TiO_2$ or other suitable stoichiometry) 308 may be provided over the matrix 306, e.g., to imbue the overall coating with photocatalytic properties for self-cleaning and/or other purposes. The layer comprising titanium oxide 308 may be doped with carbon and/or include nitrogen. The inclusion of carbon in the layer comprising titanium oxide 308 may be advantageous in terms of shifting the wavelength range in which photocatalytic properties are attainable. That is, the inclusion of carbon may enable photocatalytic properties to be obtained in visible light. Zr and/or Nb additional or alternatively may be provided in the layer comprising titanium oxide 308 to also prompt photocatalytic reactions upon exposure to visible light. Including nitrogen in the layer comprising titanium oxide 308 may be advantageous in certain example embodiments in terms of increasing sputter deposition speeds and/or enabling photocatalytic reactions to be realized more quickly. With respect to the latter, including nitrogen and/or Zr may decrease the bandgap. It is noted that the layer comprising titanium oxide 308 may be deposited as a layer comprising titanium carbide, and it may turn into a layer comprising titanium oxide, titanium oxycarbide, etc., upon further processing (e.g., heat treatment).

The layer comprising titanium oxide 308 may have channels 310 formed in it. The channels 310 may be formed by laser-scribing the layer comprising titanium oxide 308 so as to include a plurality of channels 310 that are sub-micron in size. That is, the width of the channels 310 may be less than 1 micron, and the channels 310 may be formed to a depth consistent with the thickness of the layer comprising titanium oxide 308. Preferably, the matrix 306 is not etched, i.e., the channels 310 preferably do not extend to a depth that penetrates the matrix 306. These channels facilitate the migration of $Ag^+$ ions from the matrix 306 through the layer comprising titanium oxide 308 for antibacterial and antimicrobial purposes.

In FIG. 3, the layer comprising titanium oxide 308 may have a morphology that is at least partially polycrystalline. For example, in certain example embodiments, the layer comprising titanium oxide 308 may be formed in the anatase phase. Anatase $TiO_2$ is known to provide photocatalytic reactions and may be advantages in this respect. Furthermore, anatase $TiO_2$ is fairly easy to manufacture. For example, anatase $TiO_2$ can be formed at lower temperatures compared to rutile $TiO_2$, and the lower temperatures associated with the formation of anatase $TiO_2$ (e.g., as compared to rutile $TiO_2$) may reduce the likelihood of damage to the matrix 306 therebelow. Indeed, care may be taken to ensure that heat used in the formation of the layer comprising titanium oxide 308 do not break down the carbon in the matrix 306.

Anatase $TiO_2$ is at least somewhat polycrystalline and may be advantageous in this aspect, as well. That is, polycrystallinity more generally may be advantageous, for example, because the grain boundaries may enable the $Ag^+$ ions to leach out from the matrix 306 and migrate through the layer comprising titanium oxide 308. Laser-scribing the layer comprising titanium oxide 308 may further facilitate this migration, particularly in layers that are less polycrystalline and/or lack crystallinity of any kind. In certain example embodiments, self-cleaning features provided by anatase $TiO_2$ or the like may help remove dirt that could inhibit the full migration of Ag+ ions to the surface, thereby reducing the antimicrobial effectiveness of the coating.

Figure 4:
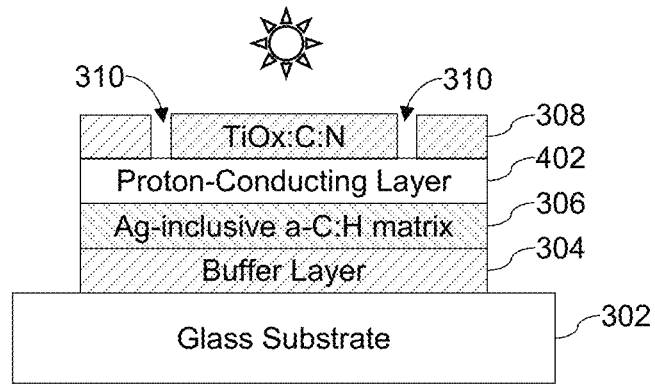
FIG. 4 is a schematic, cross-sectional view of a first variation of the FIG. 3 example coated article, in accordance with an example embodiment.

FIG. 4 is a schematic, cross-sectional view of a first variation of the FIG. 3 example coated article, in accordance with an example embodiment. The FIG. 4 coated article includes the same components as the FIG. 3 example embodiment and may be modified in the same or similar ways as those described above. In addition, a proton-conducting layer 402 is interposed between the layer comprising titanium oxide 402 and the matrix 306. The proton conducting layer may comprise zirconium oxide (e.g., $ZrO_2$ or other suitable stoichiometry). It optionally may include carbon and/or nitrogen, e.g., for the reasons noted above.

The inclusion of the proton-conducting layer 402 may be advantageous in terms of facilitating the antibacterial and antimicrobial properties of the overall coating. As will be appreciated from the description above, $Ag^+$ ions are needed to make the coating active for antibacterial and antimicrobial purposes, as Ag in DLC is generally inactive. The activation is facilitated through the donation of an electron, which in essence completes the battery. That is, an electron-hole pair is created, and an $Ag^+$ ion is made to migrate. Titanium oxide in layer 308 will be hit by sunlight and, from time-to-time, will create an electron-hole pair, thereby causing this layer to act as an electrode. In this regime, the proton-conducting layer 402 may be thought of as acting as an electrolyte. In this regime, the proton-conducting layer 402 in essence separates electrons and holes, allowing the electron hole to go down to the Ag so that $Ag^+$ ions can migrate upwardly. Thus, it will be appreciated that the inclusion of the proton-conducting layer 402 may further facilitate the antibacterial and antimicrobial properties of the overall coating. In certain example embodiments, the proton-conducting layer 402 will not be laser-etched.

Figure 5:
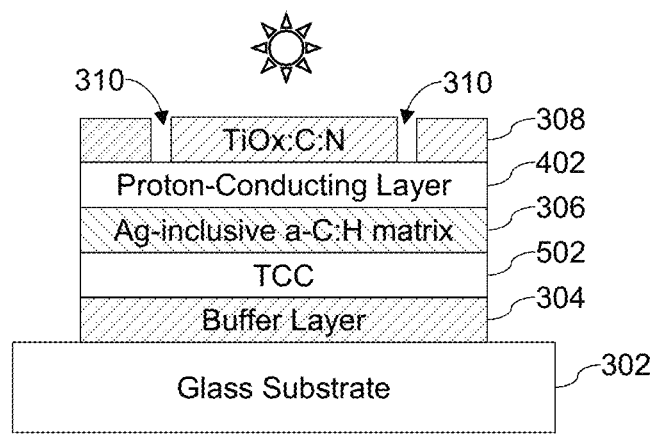
FIG. 5 is a schematic, cross-sectional view of a second variation of the FIG. 3 example coated article, in accordance with an example embodiment.

FIG. 5 is a schematic, cross-sectional view of a second variation of the FIG. 3 example coated article, in accordance with an example embodiment. The FIG. 5 coated article includes the same components as the FIG. 3 and FIG. 4 example embodiments and may be modified in the same or similar ways as those described above. In addition, a transparent conductive coating (TCC) 502 may be interposed between the buffer layer 304 and the matrix 306. The TCC 502 may be connected to a power source operating at a low voltage, e.g., to in essence push Ag out of the matrix 306. A 1-9 V charge may be sufficient for this purposes, e.g., with a 1-5 V charge being more preferable, a 1-3 V charge being more preferable, and a voltage of at least 1.23 charge being most preferable. A small battery or the like may be used to provide a small biased voltage in this respect. The TCC 502 may comprise ITO; a layer comprising Ag; a layer stack comprising a layer of Ag sandwiched between layers comprising Ni and/or Cr; and/or the like. The TCC 502 in certain example embodiments may be 5-100 nm thick, more preferably 5-60 nm thick.

It will be appreciated that the TCC 502 may be used independently from the proton-conducting layer 402. For instance, a TCC like the above-described layer may be incorporated into the FIG. 3 example embodiment, which lacks the proton-conducting layer 402.

In certain example embodiments, the buffer layer 304 may be 1-500 nm thick, more preferably 1-100 nm thick, still more preferably 5-60 nm thick, and still more preferably 5-15 nm thick, with an example thickness being 10 nm. As noted above, the matrix 306 may be very thin in certain example embodiments, e.g., 1-25 nm thick, more preferably 1-10 nm thick, and still more preferably 1-5 nm thick, with an example thickness being 5 nm. The layer comprising titanium oxide 308 may be 1-300 nm thick, more preferably 5-100 nm thick, still more preferably 5-60 nm thick, and still more preferably 10-30 nm thick, with an example thickness being 20 nm. The proton-conducting layer 402 generally will be at least as thick as the matrix 306 and thinner than the layer comprising titanium oxide 308. In this regard, the proton-conducting layer 402 may be 1-100 nm thick, still more preferably 5-60 nm thick, and still more preferably 5-30 nm thick.

As should be apparent from the above, the layer comprising titanium oxide 308, the proton-conducting layer 402, the TCC 502, and the buffer layer 304, each are optional layers in layer stack systems according to certain example embodiments. These layers may be used together with the matrix 306 in any suitable combination, sub-combination, or combination of sub-combinations.

Figure 6:
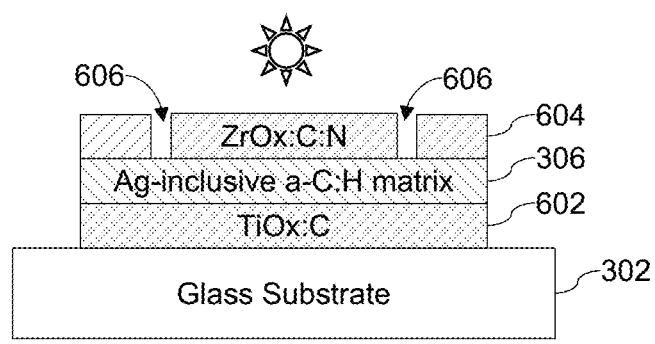
FIG. 6 is a schematic, cross-sectional view of another coated article having antibacterial and antimicrobial properties, in accordance with an example embodiment.

FIG. 6 is schematic, cross-sectional view of another coated article having antibacterial and antimicrobial properties, in accordance with an example embodiment. In the FIG. 6 embodiment, titanium oxide is used in the buffer layer 602. Here, the use of titanium oxide may be advantageous to create desired optical properties, e.g., as a high-index of refraction material adjacent the substrate 302. The buffer layer 602 here may be doped with C and/or N, e.g., for the purposes discussed above. An overcoat comprising zirconium oxide 604 may be provided over the matrix 306. This overcoat 604 may provide durability with respect to the underlying matrix 306. It too may be doped with C and/or N, e.g., for the purposes discussed above. Because the overcoat 604 may be comparatively dense and/or amorphous in certain example embodiments, it may have channels 606 formed therein, e.g., similar to as described above. These channels 606 thus may facilitate $Ag^+$ ion migration through the overcoat comprising zirconium oxide 604. In addition, the zirconium oxide therein may provide for enhanced anti-scratch performance. The thickness of this layer may be the same as or similar to that of the layer comprising titanium oxide 308. That is, the overcoat comprising zirconium oxide 604 may be 1-300 nm thick, more preferably 5-100 nm thick, still more preferably 5-60 nm thick, and still more preferably 10-30 nm thick, with an example thickness being 20 nm. It is noted that the layer comprising zirconium oxide 604 may be deposited as a layer comprising zirconium nitride, and it may turn into a layer comprising zirconium oxide, zirconium oxycarbide, etc., upon further processing (e.g., heat treatment).

Figure 7:
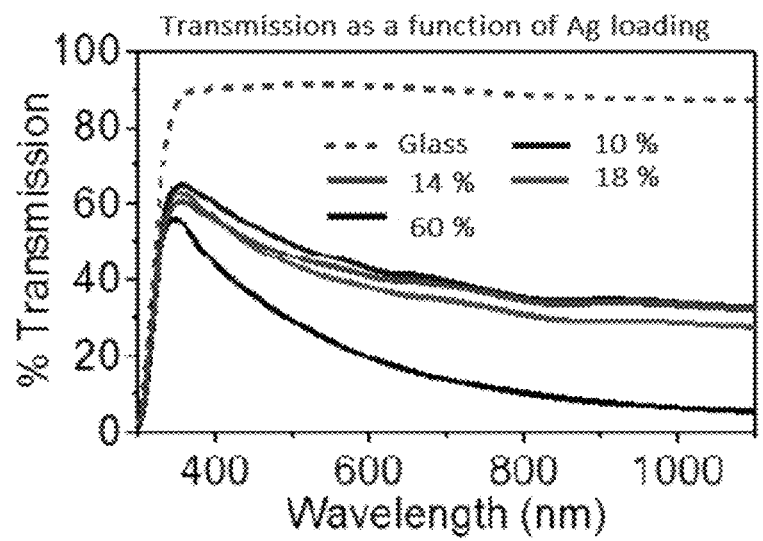
FIG. 7 is a graph plotting transmission vs. wavelength for different Ag loading amounts, relevant to certain example embodiments.

FIG. 7 is a graph plotting transmission vs. wavelength for different Ag loading amounts, relevant to certain example embodiments. The samples reflected in the FIG. 7 graph had an 18-25 nm thick overcoat comprising ZrOx on top of the nano-composite matrix. As can be appreciated from FIG. 7, Ag loading from 10-18% results in little change in the visible transmission characteristics over a wide wavelength range. For example, there is less than about 10% drop, more preferably less than a 5% drop, in transmission over all or substantially all of the 400-1200 nm range, when increasing the Ag loading percentage from 10% to 18%. It is noted that there is a slight drop in transmission when increasing from 10% to 14% over approximately the 400-600 nm wavelength range, but the difference is negligible otherwise. Thus, certain example embodiments may incorporate Ag loading in the 10-20%, more preferably in the 10-18% range, and still more preferably in the 10-15% range, with 14% being an example. These example ranges might be desirable where high transmission is desirable including, for example, in certain touch panel, display, various window, and/or other applications. On the other hand, where transmission is not as important, higher Ag loading amounts can be used. This may include, for example, shower door, skylight, other window, and/or other applications. It will be appreciated that the layer stack on the glass substrate may be tuned so that Ag loading amounts may be increased without having as significant an impact on transmission, in certain example embodiments. The use of antireflective coatings, additional dielectric layers, etc., may be used in this regard.

Figure 8:
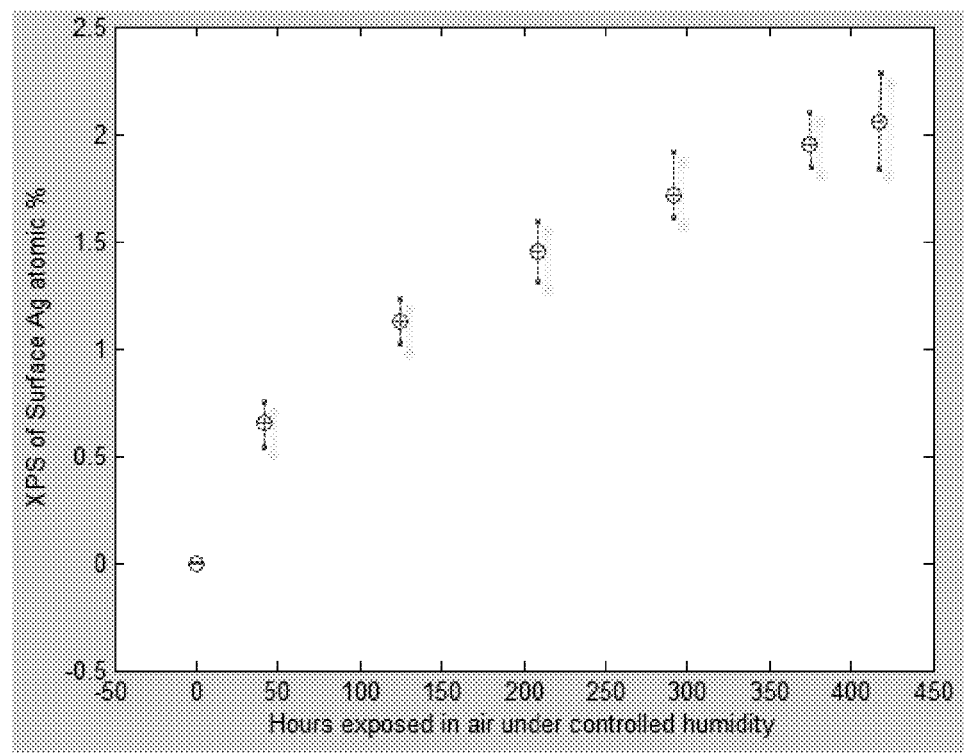
FIG. 8 is a graph plotting Ag leach data as a function of time in a 40% humidity environment, for an example embodiment.

FIG. 8 is a graph plotting Ag leach data as a function of time in a 40% humidity environment, for an example embodiment. The sample reflected in FIG. 8 included 18% Ag loading (+/−approximately 2%). XPS measurements at the surface of the coating were used to quantify Ag migration and, thus, leach performance. As can be seen, Ag migration extended for a significant amount of time, generally as a power function.

It will be appreciated that the coated articles described herein may be used in connection with window (in monolithic, IG, VIG, and/or other configurations), shower door, table-top glass, and/or other applications.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

Certain example embodiments have been described as being usable in connection with glass substrates. It will be appreciated that this includes, for example, soda lime silicate based glass substrates, borosilicate glass substrates, and/or the like, whether heat treated, thermally tempered, chemically tempered, in an annealed state, and/or the like. Other substrate types may be used in different example embodiments.

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

As alluded to above, it will be appreciated that the coatings described herein may exhibit antibacterial and/or anti-fungal properties.

In certain example embodiments, a coated article is provided. The coated article includes a glass substrate; a matrix comprising diamond-like carbon (DLC) and silver formed, directly or indirectly, on the glass substrate; and a layer comprising titanium oxide formed, directly or indirectly, on the matrix. The matrix is structured to enable silver ions produced from the silver therein to migrate towards the layer comprising titanium oxide, and the layer comprising titanium oxide is structured to enable the silver ions migrating from the matrix to pass therethrough.

In addition to the features of the previous paragraph, in certain example embodiments, the matrix may comprise a-C:H.

In addition to the features of either of the two previous paragraphs, in certain example embodiments, the matrix may comprise a-C:H:O.

In addition to the features of any of the three previous paragraphs, in certain example embodiments, the DLC in the matrix may comprise at last 30 at. % H and/or the matrix may comprise 5-35% Ag.

In addition to the features of any of the four previous paragraphs, in certain example embodiments, the layer comprising titanium oxide may be at least partially polycrystalline.

In addition to the features of any of the five previous paragraphs, in certain example embodiments, the layer comprising titanium oxide may have a substantially anatase phase and may be photocatalytic.

In addition to the features of any of the six previous paragraphs, in certain example embodiments, the layer comprising titanium oxide may further comprise C and/or N.

In addition to the features of any of the seven previous paragraphs, in certain example embodiments, a plurality of channels may be formed in the layer comprising titanium oxide, e.g., with the channels facilitating migration of the silver ions from the matrix through the layer comprising titanium oxide.

In addition to the features of any of the eight previous paragraphs, in certain example embodiments, a proton-conducting thin film layer may be located between the matrix and the layer comprising titanium oxide.

In addition to the features of the previous paragraph, in certain example embodiments, the proton-conducting thin film layer may comprise zirconium oxide.

In addition to the features of either of the two previous paragraphs, in certain example embodiments, the proton-conducting thin film layer may further comprise C and/or N.

In addition to the features of any of the three previous paragraphs, in certain example embodiments, a buffer layer may be located between the matrix and the glass substrate.

In addition to the features of the previous paragraph, in certain example embodiments, the buffer layer may comprise silicon oxide, silicon nitride, and/or silicon oxynitride. Alternatively, in certain example embodiments, the buffer layer may comprise titanium oxide.

In certain example embodiments, a coated article is provided. The coated article includes a glass substrate; a buffer layer formed, directly or indirectly, on the glass substrate; a matrix comprising diamond-like carbon (DLC) and silver formed, directly or indirectly, on the buffer layer; and an overcoat layer comprising zirconium oxide formed, directly or indirectly, on the matrix. The matrix is structured to enable silver ions produced from the silver therein to migrate towards the layer comprising zirconium oxide, and the layer comprising zirconium oxide is structured to enable the silver ions migrating from the matrix to pass therethrough.

In addition to the features of the previous paragraph, in certain example embodiments, the buffer layer and/or the layer comprising zirconium oxide may be doped with C.

In addition to the features of either of the two previous paragraphs, in certain example embodiments, the buffer layer may be doped with C and/or the layer comprising zirconium oxide may comprise C and N.

In addition to the features of any of the three previous paragraphs, in certain example embodiments, the matrix may comprise a-C:H:O.

In addition to the features of any of the four previous paragraphs, in certain example embodiments, a plurality of channels may be formed in the layer comprising zirconium oxide, e.g., with the channels facilitating migration of the silver ions from the matrix through the layer comprising zirconium oxide.

In certain example embodiments, a method of making a coated article having antibacterial properties is provided. A matrix comprising diamond-like carbon (DLC) and silver is formed directly or indirectly on a glass substrate. A layer comprising titanium oxide is formed, directly or indirectly, on the matrix. The matrix is structured to enable silver ions produced from the silver therein to migrate towards the layer comprising titanium oxide, and the layer comprising titanium oxide is structured to enable the silver ions migrating from the matrix to pass therethrough.

In addition to the features of the previous paragraph, in certain example embodiments, the layer comprising titanium oxide may have a substantially anatase phase and may be photocatalytic.

In addition to the features of either of the two previous paragraphs, in certain example embodiments, the layer comprising titanium oxide may further comprise C and/or N.

In addition to the features of any of the three previous paragraphs, in certain example embodiments, a plurality of channels may be formed in the layer comprising titanium oxide, e.g., with the channels facilitating migration of the silver ions from the matrix through the layer comprising titanium oxide.

In addition to the features of any of the four previous paragraphs, in certain example embodiments, a proton-conducting thin film layer comprising zirconium oxide may be located between the matrix and the layer comprising titanium oxide.

In certain example embodiments, a method of making a coated article having antibacterial properties is provided. A buffer layer is formed, directly or indirectly on a glass substrate. A matrix comprising diamond-like carbon (DLC) and silver is formed, directly or indirectly on the buffer layer. An overcoat layer comprising zirconium oxide is formed directly or indirectly, on the matrix. The matrix is structured to enable silver ions produced from the silver therein to migrate towards the layer comprising zirconium oxide, and the layer comprising zirconium oxide is structured to enable the silver ions migrating from the matrix to pass therethrough. The buffer layer is doped with C and the layer comprising zirconium oxide comprises C and N.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article, comprising:
   a glass substrate;
   a matrix comprising diamond-like carbon (DLC) and silver formed, directly or indirectly, on the glass substrate; and
   a layer comprising titanium oxide formed, directly or indirectly, on the matrix,
   wherein the matrix is structured to enable silver ions produced from the silver therein to migrate towards the layer comprising titanium oxide, and wherein the layer comprising titanium oxide is structured to enable the silver ions migrating from the matrix to pass therethrough.

2. The coated article of claim 1, wherein the matrix comprises a-C:H.

3. The coated article of claim 1, wherein the matrix comprises a-C:H:O.

4. The coated article of claim 1, wherein the DLC in the matrix comprises at last 30 at. % H and/or the matrix comprises 5-35% Ag.

5. The coated article of claim 1, wherein the layer comprising titanium oxide is at least partially polycrystalline.

6. The coated article of claim 1, wherein the layer comprising titanium oxide has a substantially anatase phase and is photocatalytic.

7. The coated article of claim 1, wherein the layer comprising titanium oxide further comprises C and/or N.

8. The coated article of claim 1, further comprising a plurality of channels formed in the layer comprising titanium oxide, the channels facilitating migration of the silver ions from the matrix through the layer comprising titanium oxide.

9. The coated article of claim 1, further comprising a proton-conducting thin film layer located between the matrix and the layer comprising titanium oxide.

10. The coated article of claim 9, wherein the proton-conducting thin film layer comprises zirconium oxide.

11. The coated article of claim 10, wherein the proton-conducting thin film layer further comprises C and/or N.

12. The coated article of claim 10, further comprising a buffer layer located between the matrix and the glass substrate.

13. The coated article of claim 12, wherein the buffer layer comprises silicon oxide, silicon nitride, and/or silicon oxynitride.

14. The coated article of claim 12, wherein the buffer layer comprises titanium oxide.

15. A coated article, comprising:
a glass substrate;
a buffer layer formed, directly or indirectly, on the glass substrate;
a matrix comprising diamond-like carbon (DLC) and silver formed, directly or indirectly, on the buffer layer; and
an overcoat layer comprising zirconium oxide formed, directly or indirectly, on the matrix,
wherein the matrix is structured to enable silver ions produced from the silver therein to migrate towards the layer comprising zirconium oxide, and wherein the layer comprising zirconium oxide is structured to enable the silver ions migrating from the matrix to pass therethrough.

16. The coated article of claim 15, wherein the buffer layer and/or the layer comprising zirconium oxide is/are doped with C.

17. The coated article of claim 15, wherein the buffer layer is doped with C and the layer comprising zirconium oxide comprises C and N.

18. The coated article of claim 15, wherein the matrix comprises a-C:H:O.

19. The coated article of claim 15, further comprising a plurality of channels formed in the layer comprising zirconium oxide, the channels facilitating migration of the silver ions from the matrix through the layer comprising zirconium oxide.

20. A method of making a coated article having antibacterial properties, the method comprising:
forming directly or indirectly on a glass substrate a matrix comprising diamond-like carbon (DLC) and silver; and
forming a layer comprising titanium oxide, directly or indirectly, on the matrix,
wherein the matrix is structured to enable silver ions produced from the silver therein to migrate towards the layer comprising titanium oxide, and wherein the layer comprising titanium oxide is structured to enable the silver ions migrating from the matrix to pass therethrough.

21. The method of claim 20, wherein the layer comprising titanium oxide has a substantially anatase phase and is photocatalytic.

22. The method of claim 20, wherein the layer comprising titanium oxide further comprises C and/or N.

23. The method of claim 20, further comprising forming a plurality of channels in the layer comprising titanium oxide, the channels facilitating migration of the silver ions from the matrix through the layer comprising titanium oxide.

24. The method of claim 20, further comprising forming a proton-conducting thin film layer comprising zirconium oxide, the proton-conducting thin film layer being located between the matrix and the layer comprising titanium oxide.

25. A method of making a coated article having antibacterial properties, the method comprising:
forming, directly or indirectly on a glass substrate, a buffer layer;
forming a matrix comprising diamond-like carbon (DLC) and silver, directly or indirectly on the buffer layer; and
forming an overcoat layer comprising zirconium oxide directly or indirectly, on the matrix,
wherein the matrix is structured to enable silver ions produced from the silver therein to migrate towards the layer comprising zirconium oxide, and wherein the layer comprising zirconium oxide is structured to enable the silver ions migrating from the matrix to pass therethrough, and
wherein the buffer layer is doped with C and the layer comprising zirconium oxide comprises C and N.

* * * * *